Feb. 3, 1970 C. JUND ET AL 3,493,752
INFRARED RADIATION MEASURING SYSTEM USING A DOPED
SEMICONDUCTOR DETECTOR ELEMENT
Filed July 19, 1967
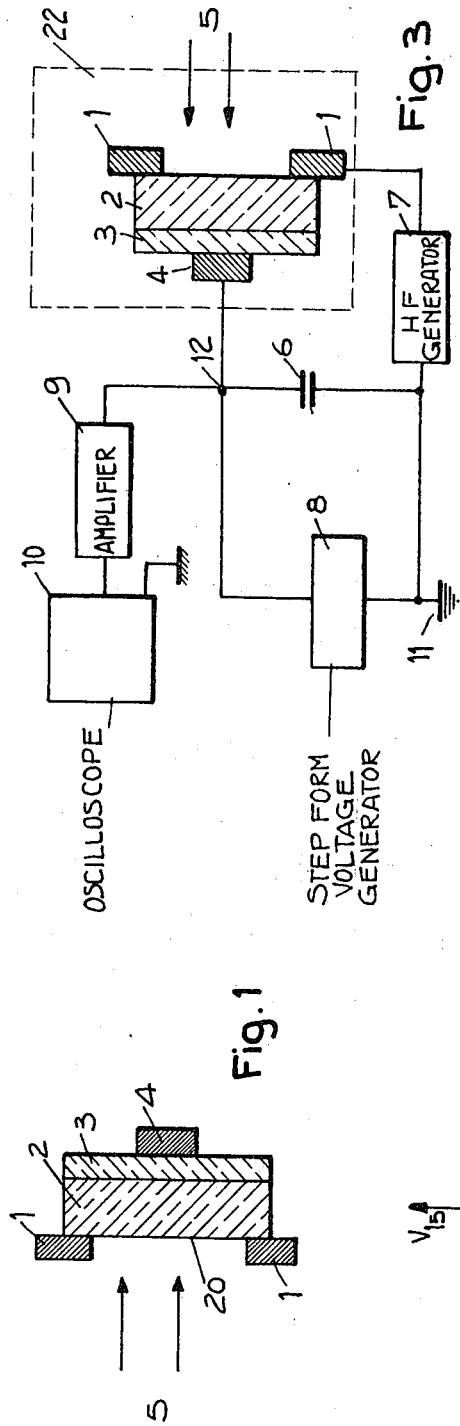
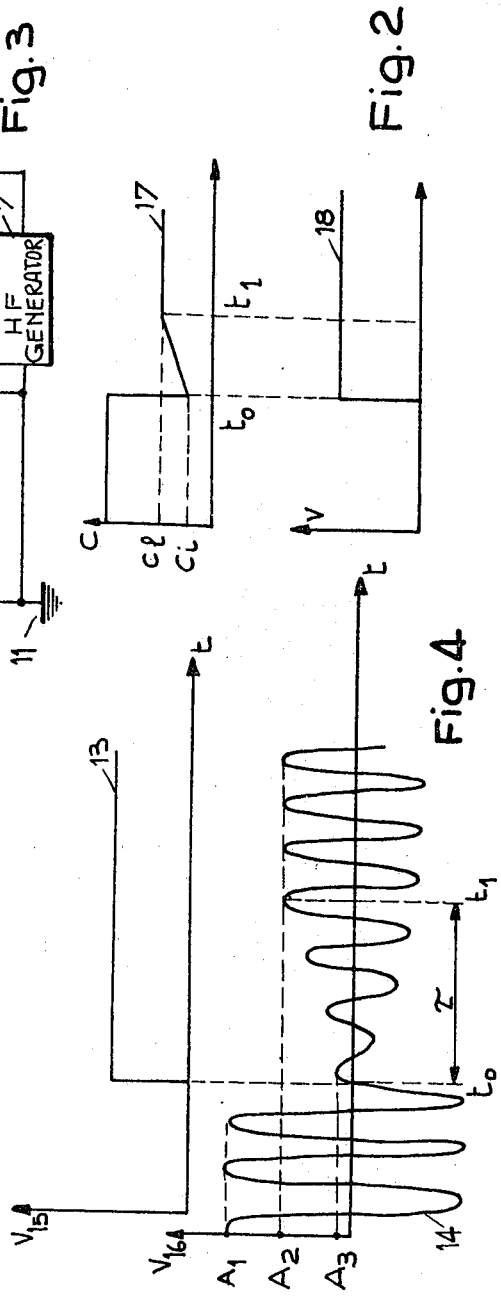

United States Patent Office 3,493,752
Patented Feb. 3, 1970

3,493,752
INFRARED RADIATION MEASURING SYSTEM USING A DOPED SEMICONDUCTOR DETECTOR ELEMENT
Christian Jund and Raymond Poirier, Paris, France, assignors to CSF-Compagnie Generale de Telegraphie Sans Fil, a corporation of France
Filed July 19, 1967, Ser. No. 654,396
Claims priority, application France, Aug. 5, 1966, 72,189
Int. Cl. G01t 1/16; H01j 39/12
U.S. Cl. 250—83.3    4 Claims

ABSTRACT OF THE DISCLOSURE

A device for measuring the intensity of infrared radiation, which comprises a semiconductor body arranged for receiving a photon flux on a free face. An insulating layer is deposited on the other face. A first ohmic contact is formed on the free face of the semiconductor body; a second ohmic contact is deposited on the free face of the insulating layer. A voltage is applied to the contacts for creating, in the semiconductor, an inversion layer constituted of minority carriers; and means are provided for measuring the formation time of the inversion layer. This time is a function of the intensity of the incident radiation.

---

This invention relates to infrared radiation detectors.

It is known that the number of carriers in a semiconductor can be modified by the action of light, i.e. of photon flux. When the photon strength is below that of the forbidden band, there is no interaction with the semiconductor, which is transparent to the radiation.

On the other hand, when the photon strength is above that of the forbidden band, each band creates an electron-hole pair; the number of carriers increases, which means an increase in conductivity. This phenomenon, term "photo-conductivity," may be used for detecting radiations.

Detectors based on the phenomenon of photo-conductivity are usually made up of a semiconductor provided with two contacts between which a direct voltage is applied. The current produced by the free charge carriers in the semiconductor body is collected by said contacts. The strength of this current is a function of the number of photons absorbed by the semiconductor.

When one of these contacts is insulated from the semiconductor, there is no electrical conduction between the two contacts. The D.C. voltage applied across the two contacts induces a space charge in the semiconductor, and this space charge increases no further beyond a specific value of the D.C. voltage applied between the contacts. There develops on the interface between the semiconductor and the insulator an inversion layer, constituted of minority carriers, the time for the formation of this layer being a function of the photon flux to which the semiconductor is subjected.

This invention relates to a semiconductor detector of infrared radiation capable of measuring the intensity of the said radiation as a function of the time of formation of the inversion layer.

According to the invention there is provided an infrared radiation measuring system, comprising a doped semiconductor body having a first face for receiving said radiation and a second face opposite to said first face; an insulating layer deposited on said second face and having a free face portion; a first contact on said first face, and a second contact on said free face: means, connected between said first and said second contacts, for applying between said contacts a constant voltage; and means for measuring, upon application of said voltage; the time constant corresponding to the appearance of the inversion layer in said semiconductor body near said insulating layer.

For a better understanding of the invention and to show how the same may be carried into effect, reference will be made to the drawing accompanying the following description, and in which:

FIG. 1 represents an infrared radiation detector according to the invention;

FIG. 2 represents a diagram explaining the operation of the detector;

FIG. 3 represents a system for measuring infrared radiations; and

FIG. 4 represents a diagram explaining the operation of the system of FIG. 3.

The detector is made up of a semiconductor material 2 on which has been deposited an insulating layer 3. Ohmic contacts 1 and 4, obtainable for example by vaporizing a metal in a vaccuum, are placed respectively on the surface 20 of the semiconductor 2 and on that face of the insulating layer 3 which is not in contact with the semiconductor 2. The contact 1 covers only a part of the surface 20 of the semiconductor 2, leaving an opening which allows the incident radiation 5 to reach the said semiconductor.

By way of a non-limitative example, the infrared radiation detector is made of crystalline tellurium 2 approximately 80 microns thick on which has been deposited a layer of tellurium oxide with a depth of about 3500 angstrom. Contacts 1 and 4, both having a thickness of 1500 angstrom, are obtained by vaporizing gold.

The operating temperature of this detector is 77° K. and the maximum sensitivity is reached for a radiation of about 4 micron wavelength.

FIG. 2 represents graphs showing the properties of the detector of FIG. 1. The impedance between the contacts 1 and 4 is a capacitance which varies under certain conditions, as a function of the incident photon flux and of the applied voltage.

If a voltage 18 is applied at time $t_0$, it is noted that the capacitance decreases suddendly at the time $t_0$, reaching a value $C_1$. After an interval of time $\tau = t_1 - t_0$, the capacitance rises again to a limit value $C_1$, as shown at 17 in FIGURE 2.

It may be shown that this time interval corresponds to the appearance of the inversion layer, constituted of minority carriers, at the insulating interface of the semiconductor. The time constant is associated with the phenomenon of space-charge generation; it is therefore sensitive to the photon radiation reaching the said semiconductor.

In accordance with the invention, measurement of the said time constant is used for measuring a photon flux. The said time constant $\tau$ is expressed by:

$$\tau = \frac{N}{U + g} \quad (1)$$

where N represents the impurity concentration in the body of the semiconductor in charges per cm.$^3$, U is the thermal generation factor (number of electron-hole pairs generated per second), and $g$ is the ratio of generation due to the photon flux, which is equal to 0 when photons are absent, and higher than 0, when a radiation is present.

The sensitivity of the measuring device according to the invention based on measuring $\tau$ can be compared with that of a conventional detector based on the variation of conductivity as a function of the photon flux; to this end, the ratio of the relative variation of the time constant of the detector in accordance with the invention $\Delta \tau / \tau$ to the relative variation of the conductivity $\Delta\sigma/\sigma$ of a conventional detector, is expressed by the relation:

$$\frac{\frac{\Delta\tau}{\tau}}{\frac{\Delta\sigma}{\sigma}} = \frac{N}{n_i + g\tau_0} \quad (2)$$

where $n_i$ represents the intrinsic concentration of the semiconductor and $\tau_0$ the life-time of the minority charge carriers in the semiconductor material.

Examination of expression 2 shows that, for low illumination levels, the term $g\tau_0$ can be disregarded, being much smaller than the term $n_i$.

It will be seen that the sensitivity of the detector in accordance with the invention is $N/n_i$ times greater than the sensitivity of a detector based on the variation of conduction as a function of photon flux.

FIG. 3 represents by way of a non-limitative example, one embodiment of the apparatus for measuring the time constant $\tau$. The radiation detector 22 which receives the photon flux 5 is connected via its contacts 1 and 4 respectively to a high-frequency generator 7 and to a capacitor 6, whose value is appreciably greater than that of the radiation detector 22.

The capacitor 6 is connected between point 4 and ground 7 in parallel with a generator 8 delivering a voltage in step form at regularly spaced time intervals.

The generator 7 is connected between point 1 and earth 11.

The point 12, common to both the capacitor 6 and the radiation detector, is connected to input of the amplifier 9, whose output is connected to a measuring appliance 10, e.g. an oscilloscope.

The operation of this set-up is as follows:

Curve 13 of FIG. 4 represents the voltage $V_{15}$ supplied by the generator 8. Graph 14 of FIG. 4 represents the voltage $V_{16}$ existing at point 12 and observed on the oscilloscope. This voltage is supplied by the generator HF7. When the voltage from the generator 8 is nil, i.e. for times $1 < t_0$, the amplitude $V_{16}$ is equal to $A_1$. At $t_0$ step voltage $V_{15}$ is applied to the radiation detector, whereupon the voltage $V_{16}$ drops down to a low amplitude $A_3$. This voltage rises afterwards up to the amplitude $A_2$ corresponding to the limiting capacitances $Cl$ at time $t_1$.

The length of the time interval $t_1 - t_0 = \tau$ represents the time constant whose value is proportional to the photon flux.

Of course the invention is not limited to the embodiment described and shown which were given solely by way of example.

What is claimed is:

1. An infrared radiation measuring system, comprising a doped semiconductor body having a first face for receiving said radiation and a second face opposite to said first face; an insulating layer deposited on said second face and having a free face portion; a first contact on said first face, and a second contact on said free face: means connected between said first and said second contacts, for applying between said contacts a constant voltage; and means for measuring, upon application of said voltage, the time constant corresponding to the appearance of the inversion layer in said semiconductor body near said insulating layer.

2. A system according to claim 1, wherein said time constant measuring means are means responsive to the variation of the capacitance between said first and second contacts.

3. A system according to claim 2, wherein said capacitance measuring means comprise a high-frequency alternating voltage source, connected between said contacts, and displaying means for displaying the high-frequency difference of potential variations, between said contacts.

4. A system according to claim 3, wherein a high-frequency amplifier is connected between said displaying means and one of said contacts.

References Cited

UNITED STATES PATENTS

| | | | |
|---|---|---|---|
| 2,669,635 | 2/1954 | Pfann. | |
| 2,706,792 | 4/1955 | Jacobs | 250—83.3 |
| 3,005,107 | 10/1961 | Weinstein. | |
| 3,202,926 | 8/1965 | Ford et al. | 250—211 |

ARCHIE R. BORCHELT, Primary Examiner

U.S. Cl. X.R.

250—211